Figure 1:
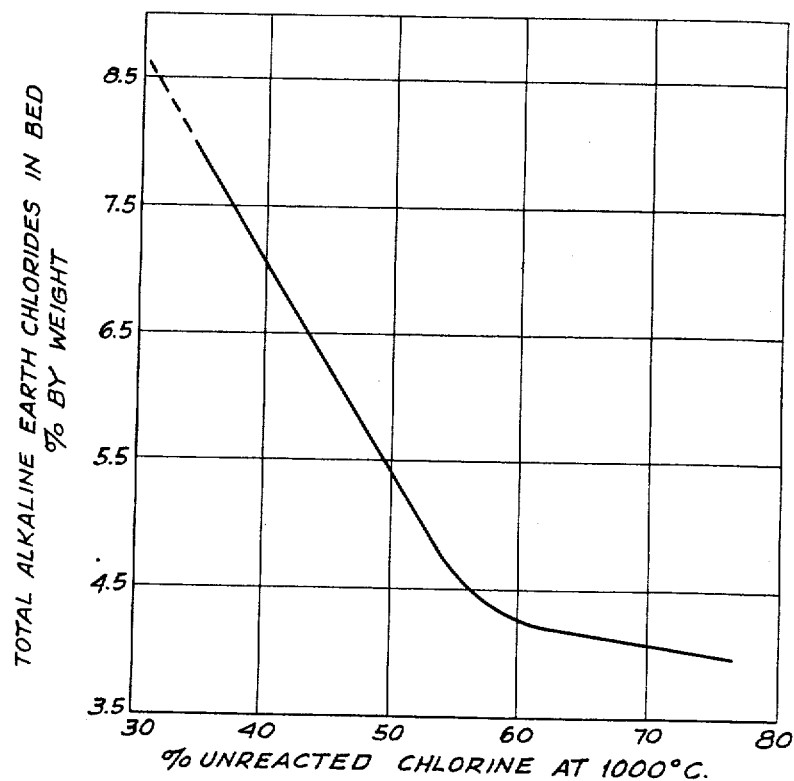

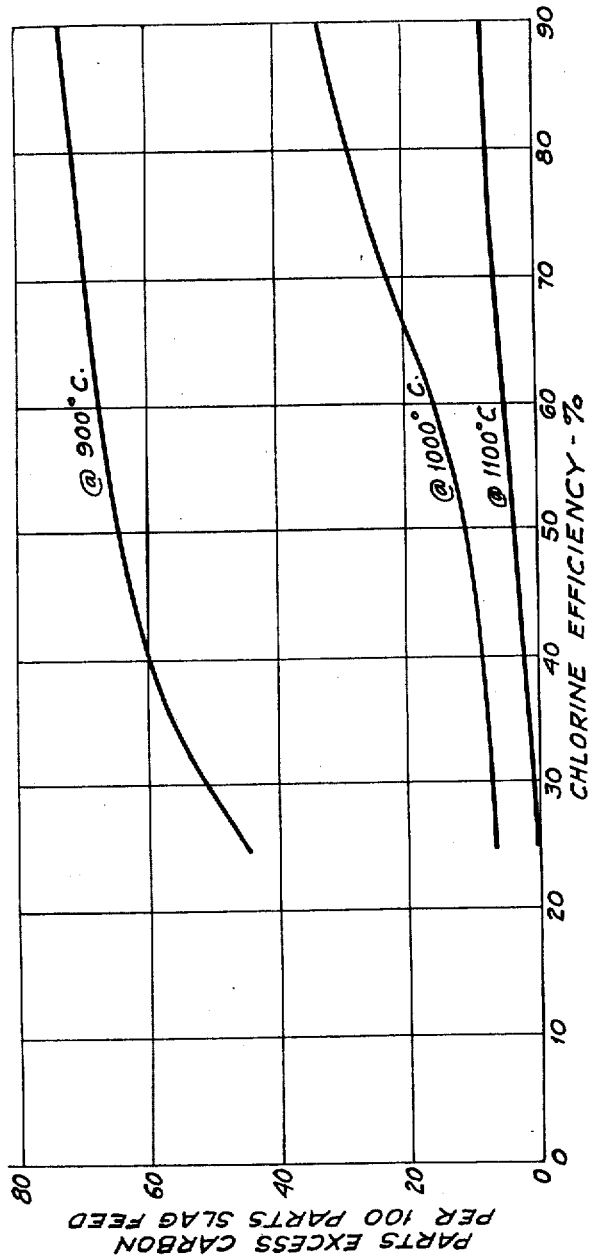

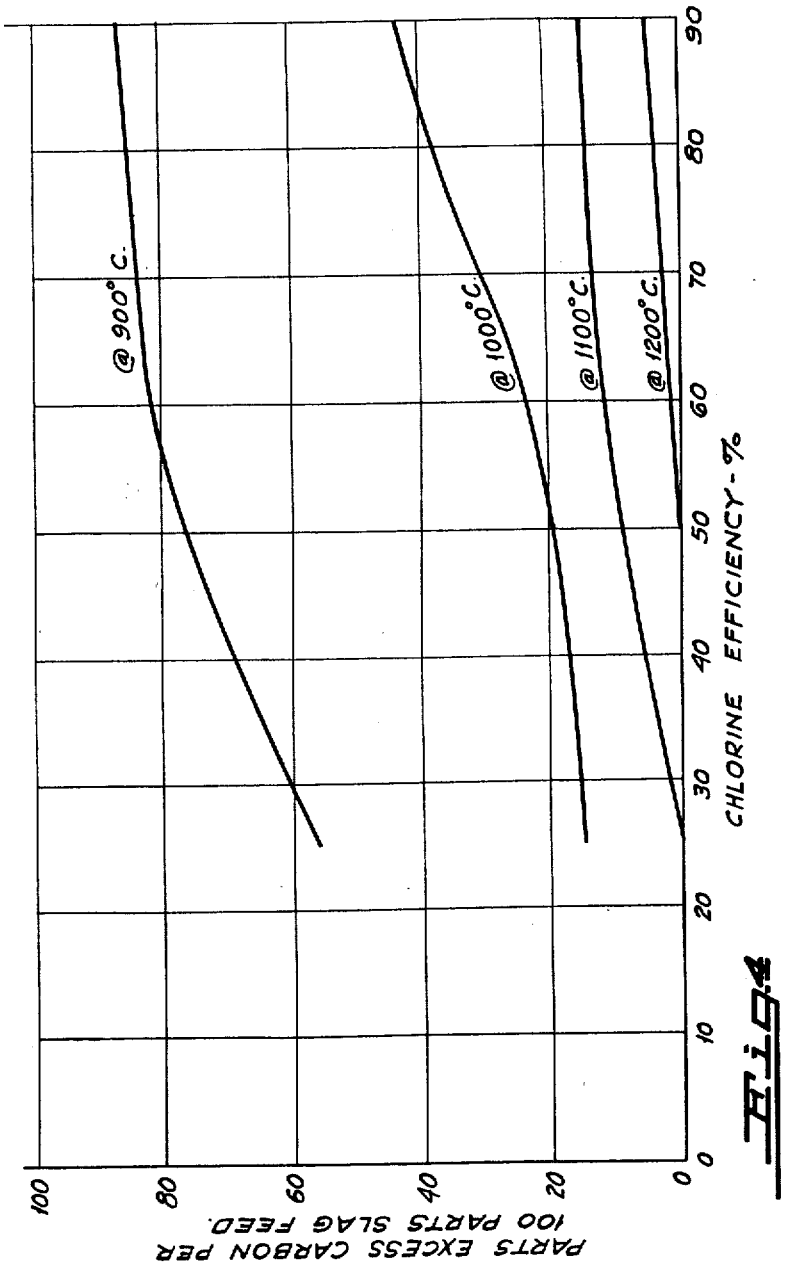

United States Patent Office 2,974,009
Patented Mar. 7, 1961

2,974,009
PRODUCTION OF TITANIUM TETRACHLORIDE

Joseph T. Bashour and Henry L. Bikofsky, New York, and Jerome N. Haimsohn, Ardsley, N.Y., assignors to Stauffer Chemical Company, a corporation of Delaware Filed Sept. 9, 1957, Ser. No. 682,895

2 Claims. (Cl. 23—87)

This invention relates broadly to the chlorination of titaniferous materials to produce titanium tetrachloride and, more particularly, to the production of titanium tetrachloride from slags containing a high percentage of titanium available as a by-product from the smelting of titaniferous ores such as ilmenite. These slags have heretofore been considered troublesome for use as a raw material in the fluidized chlorination of titanium-bearing materials to produce titanium tetrachloride because they contain compounds of magnesium, calcium, manganese, sodium, strontium, and the like. These constituents are chlorinated along with the titanium-bearing components and, since their chlorides are liquids at the temperatures normally employed in the chlorination of titanium-bearing ores, the chlorides accumulate in the fluo-solids reaction bed and destroy the fluidity of the bed by agglomeration of the solid particles. The alkaline earth chlorides, such as those of calcium and magnesium, are the greatest offenders since these are usually present in the slag in relatively substantial quantities, e.g., as much as 2% calcium as CaO and as much as 8% magnesium as MgO. The invention herein described eliminates from the reactor these alkaline earth chlorides as well as the chlorides of the other metals set forth above; it makes possible, also, the utilization of other titaniferous materials, e.g., certain native ilmenite ores, which contain sufficient of these impurities to limit their use in the manufacture of titanium tetrachloride in a fluidized reactor.

According to the present invention, it has been found that such titaniferous materials can be chlorinated effectively in a fluidized reactor at temperatures of from 800° C. to 1300° C. by observing certain conditions. The reactor is first filled with a fluidized bed of carbonaceous material such as coke, which is preheated to the desired reaction temperature while fluidizing with air. To the preheated fluidized bed of carbonaceous material is then fed continuously a mixture of carbonaceous and titaniferous materials and a chlorine-containing gas, at a rate sufficient to maintain the solids in a well-fluidized condition. The reactor may be operated under conditions wherein an excess of carbonaceous material is introduced with the titaniferous solids feed, from about 25% to as much as 300% and more of carbonaceous material being added above that required for the reaction. A concentration of at least 50% of the carbonaceous material is maintained in the bed at all times. There may be continuously withdrawn from the fluidized bed a portion of the fluidized material, thereby removing at least a portion of the by-product chlorides in admixture with the withdrawn solids at a rate such that the by-product chlorides concentration is maintained in the reaction zone at a level which will not impair the fluidizing characteristics of the bed. This level we have determined is that whereat the liquid chlorides do not exceed 15% of the total weight of solids in the bed. If solids are withdrawn, the carbon content of the withdrawn solids represents the excess of carbon which is fed into the reactor, while the initially formed bed of carbon represents the reservoir of carbon which is present at all times.

The reactor may also be operated under conditions wherein the reaction temperature and effluent gas composition are adjusted so that the by-product chlorides are removed entirely or in substantial amount in the effluent gas from the reaction zone at a rate equal to the introduction of their precursors in the solids feed. To operate in this manner, it is necessary to maintain such conditions of temperature and gas composition that the partial pressure of each of the offending metal chlorides is below its dew point in the reaction zone. At the lower temperatures, e.g., below about 1100°–1200° C., we prefer to reduce the partial pressure of these by-product chlorides in the effluent gas stream by utilizing an excess of chlorine and maintenance of unreacted chlorine in the effluent gas stream. Although it has been proposed to accomplish somewhat similar results utilizing gases such as nitrogen, carbon oxides, air and the like, chlorine gives superior results for several reasons. One is the fact that it is a reactant, and an increase in its concentration in the reaction zone favors the reaction rate ensuring more complete conversion of the solid titaniferous reactant, thereby maintaining a lower steady-state concentration of $TiO_2$ value in the bed. Further, chlorine is readily condensed, lending itself to a simple product recovery system with high recovery efficiency. As will presently be set forth in greater detail, it is possible to operate with as little as 15% of excess chlorine and still obtain complete volatilization of the offending liquid chlorides at the higher temperatures.

By operating under these conditions, i.e., by adjusting the rates of diluent solids feed and solids withdrawal, or by the use of excess chlorine or by a combination of solids withdrawal and excess chlorine, it has been found that the concentration of the by-product chlorides in the bed can be held below that level whereat they impair bed fluidity. The total rate of the objectionable by-product chlorides efflux in the solids and in the vapor effluent streams is maintained at substantially the rate of the introduction of their precursors in the solids feed stream. Furthermore, there is little loss of actual titanium value in the solid portion of the bed which is withdrawn. In this manner, it is possible to utilize relatively low cost titanium source materials and yet operate a fluidized reactor for long periods of time without the necessity of shutdown to remove accumulated by-product chlorides and ash, and without the reactor going off-stream because of the destruction of bed fluidity caused by the excessive concentration of the molten by-product liquid chlorides in the fluid bed. All of the by-product metal chlorides may be removed as solids or as vapors, but under most conditions it is more practical to remove a portion as vapor and the balance through a solids removal. Thus, the present invention contemplates operating under conditions whereby at least about 15% of the chlorine introduced does not react and is present in the effluent gas stream and wherein at least 25% in excess of the stoichiometric amount of solid carbonaceous material is fed into the reactor and a corresponding quantity of solids is withdrawn from the reactor.

The amount of excess carbon and chlorine can be coordinated to maintain the concentration of chlorides of low volatility below a selected value, preferably below 15% by weight. It is simpler, however, to adjust the carbon excess per unit of feed on a weight basis for a given excess of chlorine. This is readily determined by substitution of the appropriate values in Equations 1 and 2 based on the following:

Basis: Solids feed rate, 100 parts titaniferous material per unit time.

$a, b, c \ldots$ = Low-volatility chlorides, e.g., $MgCl_2$, $CaCl_2$, $MnCl_2$, $NaCl$, etc.

$P_S$ = Total system pressure.

$M_T$ = Total moles of bed off-gas for a given titaniferous feed at stoichiometric conversion.

$M_X$ = Moles of excess chlorine.

$M_{a, b, c}$ = Moles of components $a, b, c \ldots$ $V_{a, b, c}$ = Vapor pressure of $a, b, c \ldots$ at selected operating temperature.

$W_{a, b, c}$ = Molecular weights of components $a, b, c \ldots$ $R_{a, b, c}$ = Fraction $a, b, c \ldots$ not volatilized, i.e., remaining in bed.

$A$ = Maximum tolerable weight percent of low-volatility chlorides in bed.

$C$ = Parts by weight of excess carbon per 100 parts of titaniferous feed material.

(1)
$$\left[1 - \frac{V_a}{P_S}\left(\frac{M_T + M_X}{M_a}\right)\right] = R_a$$

$$\left[1 - \frac{V_b}{P_S}\left(\frac{M_T + M_X}{M_b}\right)\right] = R_b$$

etc.

(2)
$$(M_a W_a R_a + M_b W_b R_b + M_c W_c R_c \ldots) \times \frac{100 - A}{A} = C$$

The equations involve the excess chlorine value ($M_X$), the temperature in establishing the vapor pressure ($V_{a, b, c}$) and the titaniferous feed composition in obtaining $M_T$ and $M_{a, b, c}$.

Equation 2 gives a value (C) for the amount of excess carbon per unit of titaniferous feed on a weight basis. This will be a minimum value when the term A is equal to 15%, which has been specified as the maximum tolerable concentration of low-volatility chlorides in the bed.

Figure 2:
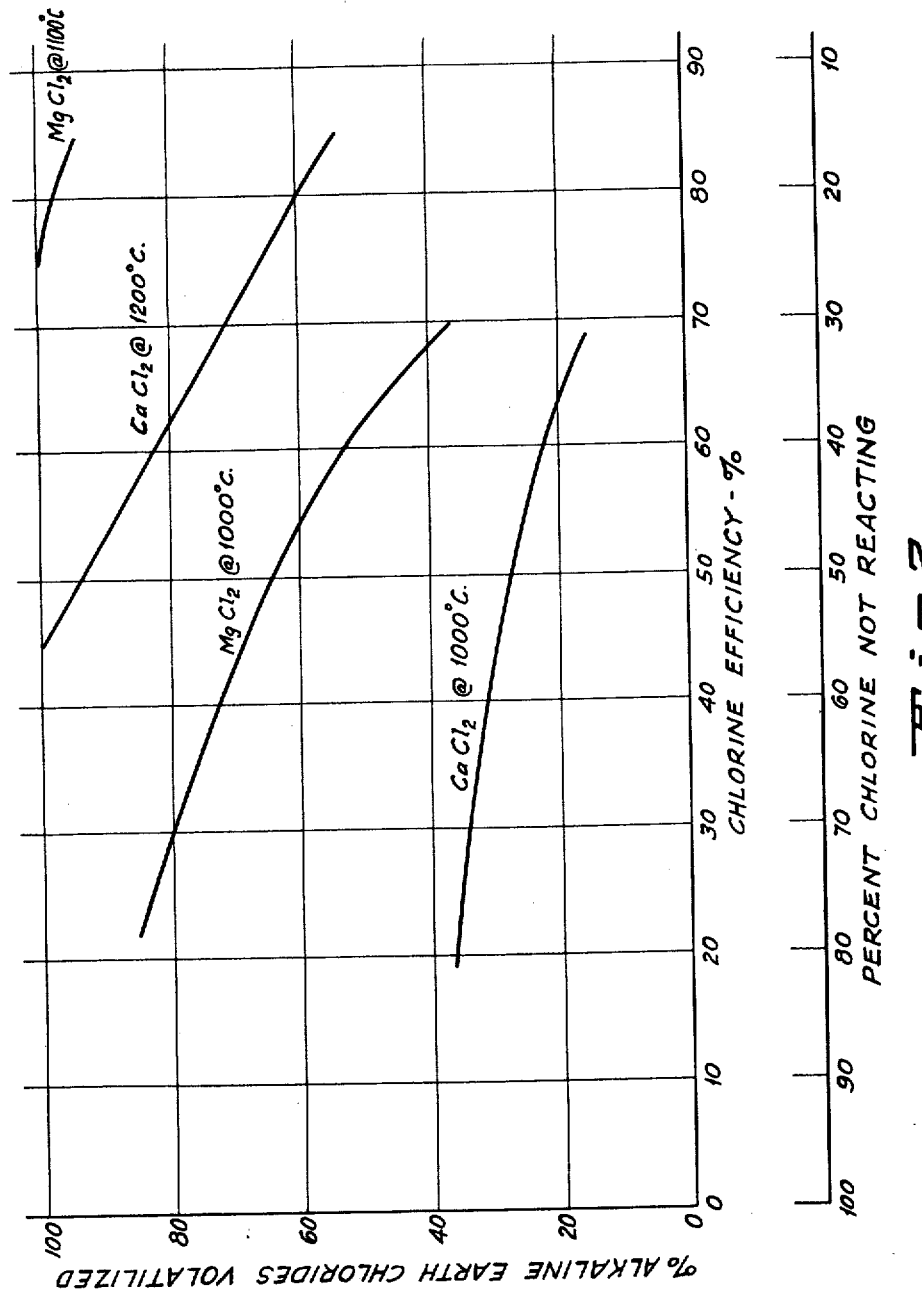

Referring to the drawings,

Figures 1 and 2 are graphical showings of various relationships which exist in the operation of a fluid bed reactor in accordance with this invention.

Figures 3 and 4 exhibit the relationship between chlorine efficiency or chlorine excess, bed temperature and excess carbon for two different slags with a 15% bed content of $MgCl_2$ and $CaCl_2$.

To carry out the process, we have used a vertical brick lined cylindrical chamber provided with inlets for the ground slag and for the ground coke, an outlet at the top for gas reaction products, inlets in the bottom for the chlorine feed gas mixture and an outlet intermediate the ends of the reactor for removing the granular solid furnace bed material; usually, the solids are taken off at about the top of the bed. The product gas exit line was brick lined and entered a vertical tubular metal cooler from which solids were withdrawn to a heated cyclone separator for the removal of solids along with any condensed phases of $MgCl_2$ and $CaCl_2$ and any molten chlorides of similar volatility. The gas exited from the cyclone contained the remaining $TiCl_4$, $FeCl_3$, $AlCl_3$ and other lower boiling product gases as well as the non-condensables such as $N_2$ and the oxides of carbon formed within the reactor. The $FeCl_3$ was separated from the $TiCl_4$ in a spray condenser, as is well known in the art.

In carrying out the present invention, a bed of a suitable carbon, e.g., petroleum coke, a low volatile content coal, active carbon or charcoal, is first placed in the reactor, fluidized and heated to reaction temperature. The temperature should be in the range of 800° C. to 1300° C. After the bed is at reaction temperature, a mixture of titaniferous material and carbon, and a chlorine-containing gas is fed into the reaction zone. The particle size of the solids preferably should be in the range of minus 20 plus 200 mesh U.S. screen, and the superficial gas velocities in the range of 0.2 to 2.0 feet per second at operating temperatures. The chlorine rate is adjusted to attain a predetermined superficial velocity at the given operating temperature to maintain the bed in a well-fluidized condition. Having fixed the gas feed rate, the solids feed rate is then adjusted to maintain the desired chlorine efficiency, which will not be over 85%, i.e. at least 15% of the chlorine introduced will be present in the effluent gas stream.

The selection of specific operational conditions, i.e. (a) the rates of diluent solids feed and solids withdrawal, (b) bed temperature, and (c) the amount of excess chlorine, is dependent on the concentration of the by-product chlorides precursors in the ore feed material. In addition, the physical properties of the molten liquid chlorides, such as their effective vapor pressures, viscosities, and mutual solubilities, are important factors influencing operating conditions. The character, specific adsorptive capacity, and particle size of the bed diluent solids are also important factors.

When operating under conditions where the reaction temperature and effluent gas composition are adjusted so that the by-product chlorides are largely eliminated in the vapor phase, the concentration of the molten liquid chlorides precursors in the titaniferous feed and the effective vapor pressures of these liquid chlorides are most important in determining the reaction temperature and gas composition required to effect their removal from the bed. The bed temperature and the concentration of unreacted chlorine are adjusted so that the temperature of the product gas stream is above the dew point of the objectionable by-product liquid chlorides.

When operating under conditions where carbonaceous solids are introduced with the titaniferous feed, and solids are continuously withdrawn from the bed to remove a portion of the by-product liquid chlorides, an important factor in determining the upper tolerable concentration limit of the by-product chlorides in the bed is the specific adsorptive capacity of the solid diluent employed. For example, with calcined petroleum coke 7.5% to 11 weight percent of the by-product chlorides can be tolerated; with activated carbons or charcoals, 11 to 15 weight percent of the molten salts can be present without impairing bed fluidity. Such factors as finer particle size (greater surface) of the bed diluent, higher fluidization gas velocities, and higher temperatures (i.e., lower viscosity of molten chlorides) will increase the toleration limit of the molten chlorides for a given bed diluent.

Product gases are taken from the reactor and purified by methods well known to those skilled in the art and not forming a part of the present invention. When operating under conditions where a substantial excess of chlorine is employed a suitable chlorine recovery unit is incorporated in the system. This can be a refrigeration system. Alternatively, a liquid adsorption and stripping system, utilizing, for example, liquid titanium tetrachloride as the adsorbent, can be employed to recover the unreacted chlorine from the vent gas.

When a substantial excess of chlorine is employed, it may be necessary to supply additional heat to the system. This may be done in various ways known to the art. It can be accomplished most easily by introducing some air or oxygen with the chlorine feed to burn a corresponding amount of additional coke within the reaction bed.

The following non-limiting examples illustrate the practice of the invention.

*Example 1.*—To an externally heated 4" I.D. 5 ft. long quartz reaction tube containing a pebble and sand bed support was added 2 kg. of petroleum coke (−100 +200 mesh). An inert gas (nitrogen) flow through the bed was maintained at a superficial velocity of about 0.4 ft./sec. while the furnace was being heated to reaction temperature. When the temperature reached 900° C., the gas feed was switched from nitrogen to chlorine, maintaining a superficial gas velocity in the reaction bed of 0.4 ft./sec. This coincides with a feed to about 0.49 s.c.f.m. A previously prepared stoichiometric mixture of slag and coke (—100 +200 mesh) was then fed to the reaction continuously by a screw feeder at a net slag rate of about 28.5 gms./min.

The titaniferous slag used in this run had the following analysis:

| | Percent |
|---|---|
| Equiv. corrected $TiO_2$ | 77.1 |
| Total Fe | 9.5 |
| FeO | 11.6 |
| Metallic Fe | 0.44 |
| $Ti_2O_3$ as $TiO_2$ | 9.1 |
| $SiO_2$ | 2.7 |
| $Al_2O_3$ | 3.2 |
| CaO | 0.7 |
| MgO | 4.7 |
| $Cr_2O_3$ | 0.22 |
| $V_2O_5$ | 0.53 |
| MnO | 0.27 |
| C | 0.02 |
| S | 0.06 |

The bed temperature was maintained at 900° C. for several hours with a chlorine consumption efficiency of approximately 90%. At the end of this period, the essentially isothermal temperature profile characteristic of fluid bed operation began to deteriorate progressively and temperature differentials in the reactor bed became as large as 200° C. At the same time, the differential pressure across the reaction bed began to approach zero, indicative of loss of fluidization and channeling of the chlorine. This observation was confirmed by a falling rate of titanium tetrachloride production; disassembly of the reactor indicated that the reaction bed had completely sintered together. Bed residue samples from different portions of the bed analyzed between 12% and 18% combined calcium chloride and magnesium chloride.

*Example 2.*—A series of tests were carried out at 1000° C. in a 4" I.D. quartz tube reactor, heated by external natural gas burners. In each test a charge of 1500 gms. of each of the following solids (—60 +200 mesh) was placed in the cold quartz tube, then fluidized with a stream of nitrogen, and the temperature then brought to 1000° C. The superficial gas velocity at 1000° C. was 0.5 foot per second. A mixture of 2 parts magnesium chloride and 1 part calcium chloride (both anhydrous and sized as particles passing through a 60 mesh U.S. screen) was fed into the bed in 5 gram increments, through the top of the reactor. The differential pressure drop across the fluidized bed was recorded continuously on a conventional recording instrument. The temperature gradient across the bed was also continuously recorded with two sensing thermocouples submerged in the bed spaced 8" apart. The fluidization character of the bed was impaired when the temperature points diverged and the differential pressure decreased substantially. Solids samples were removed from the bed for analysis when the fluidization was adversely affected. The following table summarizes the results, and gives the concentration of molten chlorides which caused agglomeration of the fluidized particles in the bed.

| Bed Diluent | Weight Percent Molten Chloride in Bed |
|---|---|
| Sand | 1.5 to 2.5 |
| Calcined Petroleum Coke | 7.5 to 11 |
| Activated Coconut Charcoal | 11 to 14 |
| Hard Wood Charcoal | 12 to 15 |

*Example 3.*—To an externally heated 4" I.D. 5 ft. long quartz reaction tube containing a pebble and sand bed support was added 2 kg. of petroleum coke (—100 +200 mesh). An inert gas (nitrogen) flow through the bed was maintained at a superficial velocity of about 0.4 ft./sec. while the reactor was being heated to reaction temperature. When the temperature reached 1150° C., the gas feed was switched from nitrogen to chlorine, maintaining a 0.4 ft./sec. superficial velocity in the reaction bed. This coincides with a feed of about 0.43 s.c.f.m. of chlorine. A previously prepared stoichiometric mixture of slag and coke (—100 +200 mesh) was then fed to the reactor continuously by a screw feeder, at a net slag rate of 11.0 to 17.7 grams per minute. The bed temperature was maintained uniformly at 1150° C. throughout the run. The collection of crude $TiCl_4$ in the product receiver began within 20 minutes after the initial introduction of the slag-coke feed. The continuous chlorination was allowed to proceed for 13.5 hours, at which time the run was terminated as per schedule. During the run, 12.42 kg. of slag was fed to the reactor. The titanium content of the slag was converted, substantially quantitatively, to $TiCl_4$. After correction for the by-product chlorides, the average overall chlorine efficiency was 61%.

The titaniferous slag used in this run had the following analysis:

| | Percent |
|---|---|
| Equiv. corrected $TiO_2$ | 77.1 |
| Total Fe | 9.5 |
| FeO | 11.6 |
| Metallic Fe | 0.44 |
| $Ti_2O_3$ as $TiO_2$ | 9.1 |
| $SiO_2$ | 2.7 |
| $Al_2O_3$ | 3.2 |
| CaO | 0.7 |
| MgO | 4.7 |
| $Cr_2O_3$ | 0.22 |
| $V_2O_5$ | 0.53 |
| MnO | 0.27 |
| C | 0.02 |
| S | 0.26 |

The stoichiometric quantity of $MgCl_2$ and $CaCl_2$ obtainable from the slag utilized in the run would total 150 grams. If these materials had remained in the bed, along with the quantity of coke introduced initially (2000 g.), they would have represented well over 40% of the total residual weight. The bed residue, after completion of the run, was found by analysis to contain less than 1% $MgCl_2$ and $CaCl_2$. Therefore, substantially all of the magnesium and calcium was volatilized and removed in the exit gas stream as volatile chlorides.

*Example 4.*—To an externally heated 4" I.D., 5 ft. long quartz reaction tube containing a pebble and sand bed support, was added 1 kg. of calcined petroleum coke (—100 +200 mesh). Nitrogen flow through the bed was maintained at a superficial velocity in the bed of about 0.4 ft./sec. while the system was heated to reaction temperature. When the temperature reached 1150° C., the gas feed was switched from nitrogen to chlorine, also maintained at 0.4 ft./sec. superficial gas velocity in the fluidized bed; this coincides with a feed rate of about 0.43 s.c.f.m. of chlorine. A previously prepared stoichiometric mixture of slag and coke (—100 +200 mesh) was then fed to the reaction continuously by a screw feeder at a net slag feed rate of 11.9 to 13.2 gms./min. The bed temperature was maintained at 1150° C. throughout the run.

The collection of crude $TiCl_4$ in the product receiver began several minutes after the initial introduction of the slag-coke feed mixture. The continuous chlorination was allowed to proceed for 18¼ hours at which time the run was terminated as per schedule. During the run, 13.9 kg. of slag were fed to the reactor. The titanium content of the slag was converted quantitatively to $TiCl_4$. After correction for by-product chlorides, the average overall chlorine efficiency was 54%.

The titaniferous slag used in this run had the following analysis:

| | Percent |
|---|---|
| Equivalent corrected $TiO_2$ | 70.9 |
| Total Fe | 7.8 |
| FeO | 9.2 |
| Metallic Fe | 0.63 |
| $Ti_2O_3$ as $TiO_2$ | 14.6 |
| $SiO_2$ | 5.9 |
| $Al_2O_3$ | 6.6 |
| CaO | 1.1 |
| MgO | 5.4 |
| $Cr_2O_3$ | 0.27 |
| $V_2O_3$ | 0.53 |
| MnO | 0.22 |
| C | 0.04 |
| S | 0.18 |

The stoichiometric quantity of $MgCl_2$ and $CaCl_2$ obtained from the slag utilized in the run would total 1733 gms. If these materials had remained in the bed, the bed would have been a hard monolithic mass at room temperature. The bed residue, after completion of the run, was found by examination to be a free-flowing particulate mass containing less than 9.5% of these chlorides.

It can thus be seen that a combination of excess chlorine, acting as a carrier gas, and a sufficiently high bed temperature level, were capable of effecting substantially complete volatilization of by-product alkaline earth chlorides by maintaining the temperature of the furnace gases above the dew point of said by-product chlorides.

*Example 5.*—To an externally heated 4" I.D. 5 ft. long quartz reaction tube containing a pebble and sand bed support was added 1 kg. of calcined petroleum coke (−100 +200 mesh). Nitrogen was used to fluidize this material until a temperature of 1250° C. had been attained when chlorine was substituted for the nitrogen. A superficial chlorine velocity of 0.5 ft./sec. was maintained in the reaction bed, corresponding to a chlorine feed rate of approximately 42 gms./min. A previously prepared stoichiometric mixture of slag and coke (−100 +200 mesh) was then fed to the reactor continuously by a screw feeder at a net slag feed rate of approximately 28 gms./min. This slag was of the same composition as that described in Example 4. The bed temperature was maintained uniformly at 1250° C. throughout the run. The collection of crude $TiCl_4$ commenced several minutes after the introduction of the solids feed to the reactor. The continuous chlorination proceeded for 11¾ hours, at which time the run was terminated, as per schedule.

The overall chlorine and titanium conversion efficiencies were 85% and 98%, respectively. Sufficient $MgCl_2$ and $CaCl_2$ were produced during the run to have completely cemented the bed into sinters if these materials had accumulated in the reaction bed. However, bed samples taken at regular intervals during the course of the run indicated an equilibrium alkaline earth chloride content of between 1% and 3.5%. The quality of bed fluidity remained unimpaired through the experiment. Thus, with a minimum of excess $Cl_2$ in the product gas stream, but at a sufficiently high temperature, 1250° C., it is possible to maintain a non-destructive concentration of molten by-product material in a slag chlorination bed with no bed withdrawal stream. This is achieved by maintaining the bed temperature above the dew point of the by-product chlorides.

The following examples illustrate other preferred methods of carrying out the present invention. In each instance, a titaniferous slag was used which had the following analysis:

| | Percent |
|---|---|
| $TiO_2$ | 71.0 |
| Total Fe | 7.7 |
| FeO | 9.0 |
| Metallic Fe | 0.69 |
| $Ti_2O_3$ as $TiO_2$ | 16.9 |
| $SiO_2$ | 6.3 |
| $Al_2O_3$ | 6.9 |
| CaO | 1.3 |
| MgO | 5.4 |
| $Cr_2O_3$ | 0.26 |
| $V_2O_5$ | 0.58 |
| MnO | 0.26 |
| C | 0.19 |
| S | 0.09 |

*Example 6.*—The fluidized bed was maintained at a temperature of 1000° C. The material fed in as solid feed consisted of 50% slag and 50% petroleum coke, all passing a 40 mesh screen and being retained by a 200 mesh screen. Approximately 37.5% by weight of the solids feed consisted of coke which was in excess of that required to react with the slag. A superficial velocity of 0.4 foot per second was maintained within the bed. During the run, solids were continuously removed from the reaction zone through a side outlet having an opening near the top of the bed; the coke content of the removed solids represented about 37.5% of the total solids feed. In other words, the solids removed represented the amount of equivalent coke which was in excess of the theoretical requirements plus other accumulated material, e.g., the accumulated liquid chlorides. Throughout the run, the chlorine efficiency was maintained at 66%, and under these conditions it was found that the amount of titanium value which was withdrawn was only about 5% of that fed. It was further found that the fluid bed maintained an alkaline earth chloride content of about 10% throughout the run.

It was thus possible, by using a combination of elevated bed temperature, excess chlorine carrier gas, and excess coke as an absorbing agent, to maintain the by-product molten liquid chloride content in the fluid bed at a predetermined nondestructive concentration. Those by-product molten chlorides not exiting as vapors from the furnace were adsorbed onto the bed particles, which were essentially petroleum coke, and then removed in the bed solids withdrawal stream.

*Example 7.*—To a fluidized bed of coke maintained at 1000° C. was fed continuously the same 50% titaniferous slag–50% coke mixture used in Example 6. Chlorine was fed at a superficial velocity of 0.4 foot per second. Throughout the run the chlorine efficiency was maintained at 52%. Continuous withdrawal of solids was carried out as in Example 6. It was found that the loss of titanium value withdrawn with the solids was only about 2.5% of the total fed. The bed maintained an alkaline earth chloride content of about 7.5% without further build-up.

It may be seen, therefore, in comparison with Example 6, that by increasing the concentration of excess chlorine in the product gas stream, while maintaining constant other pertinent conditions such as excess coke and bed temperature, it was possible to effect a substantial reduction in the equilibrium concentration of the by-product molten liquid chlorides in the reaction bed.

*Example 8.*—To show the utility of the invention, consecutive runs were made on succeeding days, the reactor being shut down at the end of a day's run and started up on the next day. In each case the previous day's bed would be fluidized with $N_2$ while raising the temperature to 1000° C., at which point $Cl_2$ would be substituted for $N_2$. The reverse procedure would be followed at shut-down while bringing the bed "down" to room temperature. Ideal fluidity was maintained throughout the entire run.

The slag used was of the following composition:

| | Percent |
|---|---|
| $TiO_2$ | 71.0 |
| CaO | 1.3 |
| MgO | 5.4 |
| FeO | 9.4 |

The results were as follows:

| Hours "on stream" | $Cl_2$ Consumption Efficiency, Percent | Alkaline Earth Chlorides in bed, Percent |
|---|---|---|
| 5¼ | 36.6 | 4.1 |
| 8½ | 25.8 | 4.1 |
| 5¾ | 32.4 | 4.2 |
| 6 | 29.3 | 3.2 |
| 3 | 46.1 | 5.0 |
| 4 | 46.4 | 4.6 |
| 6 | 52.2 | 5.9 |
| 5¾ | 54.0 | 6.0 |
| 4½ | 53.8 | 6.2 |
| 4¼ | 63.8 | 7.6 |
| 7¼ | 63.8 | 7.8 |
| 6 | 66.2 | 8.0 |
| 3 | 66.2 | |

The bed was fluid during each run and undesirable solidification of the bed due to the presence of the chlorides of calcium and magnesium was absent.

In Figures 1 and 2, the results of several runs at 1000° C. with the same slag, fed with a stoichiometric amount of calcined petroleum coke under like conditions, have been compared in graphical form. In these runs, chlorine efficiency was varied by changing the solids feed rate and keeping the chlorine rate constant. In this way, a constant superficial gas velocity was maintained in the bed.

It is evident from the other examples that the curve of Figure 1 would be displaced downward and to the left at temperatures above 1000° C., i.e., the total by-product chlorides in the bed would be less with an equal quantity of unreacted chlorine in the effluent stream. At temperatures below 1000° C., the curve of Figure 1 is displaced upward and to the right, i.e., the total by-product chlorides in the bed would be greater than in Figure 1 with a lesser quantity of diluent chlorine in the effluent gas stream. Similarly, the curves of Figure 2 are displaced upward and to the right at temperatures above 1000° C., as is shown; note that a temperature of only 1100° C. and a chlorine efficiency of 75% suffice to the removal of all the magnesium chloride. At temperatures below 1000° C., the curves of Figure 2 are displaced downward and to the left and a smaller quantity of these chlorides appear in the effluent gas stream.

Figures 1 and 2 indicate graphically the relationship between chlorine efficiency and the tendency of the by-product chlorides to accumulate in the slag-coke bed. From these, it is apparent that the greater the quantity of unreacted chlorine in the reaction zone and in the exit gases, at a given temperature, the greater is the quantity of the by-product chlorides in the gas phase and the less is the quantity of these chlorides which condense as liquids in the fluid bed. This is because the greater the quantity of free chlorine at a given temperature, the lower is the dew point of the by-product chlorides in the product gas stream. The addition of other diluent gases such as $TiCl_4$ in the chlorine feed or increasing the temperature have the same effect as chlorine by reducing the partial pressure of the by-product chlorides in the effluent gas.

*Example 9.*—This reaction was carried out in a 10 ft. high 26.5" I.D. reactor lined with nine inches of refractory brick and 13.5 inches of insulating brick, contained within an outer steel shell. The product gases were recovered in conventional equipment after leaving the reactor through an outlet located at the reactor top.

The reactor was preheated with natural gas burners for a period of 24 hours, at which time calcined petroleum coke was introduced into the reactor continuously, and it was both combusted and maintained in a fluidized state by means of an air stream fed into the bottom gas inlets. The coke bed temperature was allowed to rise in this fashion until a temperature of approximately 900° C. had been attained. At this point, a mixture of ilmenite and calcined petroleum coke (—30 +200 mesh) were metered into the reactor at a net ilmenite rate of 162 lbs./hr. and a net coke rate of 107 lbs./hr. The coke content of this mixture was approximately 160% in excess of that required for stoichiometric reduction of the oxidic constituents of the ilmenite.

This ilmenite had the following analysis:

| | Percent |
|---|---|
| $TiO_2$ | 60.0 |
| FeO | 25.5 |
| $Fe_2O_3$ | 4.1 |
| $SiO_2$ | 0.5 |
| $Al_2O_3$ | 1.3 |
| CaO | 1.0 |
| MgO | 1.6 |
| $Cr_2O_3$ | 0.1 |
| $V_2O_5$ | 0.2 |
| $P_2O_5$ | 0.3 |
| Others | 6.0 |

This was immediately followed by the substitution of $Cl_2$ for the fluidizing air stream. The $Cl_2$ had a superficial velocity in the reaction bed of 0.5 ft./sec., which correponds to a $Cl_2$ feed rate of approximately 359 lbs./hr. Product began to appear within several minutes in the $TiCl_4$ recovery system. In conjunction with the $TiCl_4$ recovery system was a conventional chlorine recovery unit. This equipment in essence consisted of a $Cl_2$ absorber utilizing chilled $TiCl_4$ as the absorbing medium and a stripper-fractionator for separating the $Cl_2$ from the $TiCl_4$. The recovered $Cl_2$ was recycled back into the $Cl_2$ feed to the reactor. Provision was made for bed temperature control. A conventional temperature indicator-controller actuated a solenoid valve metering air into the $Cl_2$ feed stream. This air burned the carbonaceous components of the bed thereby raising the bed temperature as required. Additional carbon was fed as required to compensate for the amount consumed. Another controller would actuate a solenoid valve which metered crude $TiCl_4$ through a top inlet of the reactor and thence onto the fluid bed, thereby providing bed temperature reduction as required.

The continuous chlorination proceeded for 48 hours, at which time it was terminated as per plan. During this period the stoichiometrically excess coke constituted the major constituent of a bed withdrawal stream. Other minor components of this stream were unreacted ilmenite, unreacted components of the ilmenite, and liquid by-products $CaCl_2$ and $MgCl_2$ adsorbed onto these solid particles. The average $Cl_2$ consumption efficiency was calculated to be 70%, and 97% of the titanium fed was recovered as $TiCl_4$. Sufficient $MgCl_2$ and $CaCl_2$ were produced during the run to have completely sintered the fluidized reaction bed. However, the quality of bed fluidity remained unimpaired throughout the run and an equilibrium concentration of 10% combined by-product chlorides was established in the reaction bed. Thus, at the relatively low reaction temperature of 900° C., an alkaline earth oxide-containing ilmenite was successfully chlorinated by use of the bed withdrawal technique in conjunction with the use of excess $Cl_2$.

*Example 10.*—The process of Example 9 was repeated except that (a) the titaniferous feed material had a composition as that in Example 4; (b) devolatilized hardwood charcoal was used as the carbonaceous bed and feed material; and (c) the bed temperature was maintained at 900° C. The net slag and charcoal feed were 153 lbs./hr. and 90 lbs./hr., respectively. This charcoal feed was approximately 134% in excess of that amount required for stoichiometric reduction of the oxidic constituents of the slag feed. The reaction was allowed to proceed for 58 hours during which period an average $Cl_2$ consumption efficiency of 65% and a titanium conversion efficiency of 97.5% were realized. The quality of bed fluidity remained unimpaired throughout the run with all bed samples assaying between 14% and 15% by-product water soluble chlorides. The excess charcoal constituted the major constituent of a bed solids overflow stream, in addition to various other solids feed and by-product materials onto which the by-product molten salts were occluded. It was found, therefore, that a lesser amount of carbonaceous diluent was required when employing charcoal in place of petroleum coke, as in Example 6.

*Example 11.*—The process of Example 9 was repeated except that the titaniferous material was composed of equal parts of the slag used in Example 4 and a rutile assaying 98% $TiO_2$, and the bed temperature was maintained at 950° C. The net slag-rutile and coke feeds were 153 and 87 lbs./hr., respectively. The coke feed was approximately 126% in excess of that amount required for stoichiometric reduction of the oxidic constituents of the slag-rutile feed. The reaction was allowed to proceed for 78 hours during which period an average-per-pass chlorine consumption efficiency of 70%, and a titanium conversion efficiency of 95% were experienced. The quality of bed fluidity remained unimpaired throughout the run with all bed samples assaying between 9.5 and 10.5% by-product water soluble chlorides. The excess coke constituted the major constituent of a bed solids overflow stream, in addition to the various other solids feed and by-product materials onto which the by-product molten chlorides were occluded.

In this fashion, therefore, by diluting the slag feed material with rutile, we were able to reduce the concentration of those materials in the feed which react with $Cl_2$ to form materials which are molten under the conditions which normally are obtained in high temperature chlorination furnaces. We were in this case thereby able to effect a substantial reduction in the excess coke requirements as compared to those requirements described in Example 6.

*Example 12.*—The process of Example 9 was repeated except that the titaniferous slag feed material had a composition as in Example 6, and the bed temperature was maintained at 1000° C. The net slag and coke feeds were 59.3 and 33.4 lbs./hr., respectively. This represents a stoichiometrically excess coke feed of approximately 123%. The reaction was allowed to proceed for 53 hours during which period an average-per-pass chlorine consumption efficiency of 25%, and a titanium conversion efficiency of 99% were experienced. The quality of bed fluidity remained ideal throughout the run with all bed samples assaying between 9% and 10.5% combined by-product chlorides. The excess coke constituted the major constituent of a bed overflow stream, in addition to the various other solids feed and by-product constituents onto which the molten by-product chlorides were occluded.

It is evident, therefore, by causing a substantial excess of chlorine to be present in the product gas stream, we were able to lower the dew point of the by-product chlorides to the extent that a sufficient increase in that portion of the total amount of these materials that leaves the reaction zone in a vaporous form was effected. This is evidenced by comparing the results obtained here with those results obtained in Example 6. This comparison reveals that approximately 56% as much coke was fed in this run compared with that of Example 6.

*Example 13.*—To an externally heated 4 in. I.D., 4 ft. long quartz reaction tube containing a pebble and sand bed support, was added 2 kg. of petroleum coke (−40 plus 200 mesh). An inert gas (nitrogen) flow through the bed was maintained at a superficial velocity of about 0.5 ft./sec. while the furnace was being heated to the predetermined reaction temperature. When the temperature reached 1000° C., the gas feed was switched from nitrogen to chlorine, maintaining a 0.5 ft./sec. superficial velocity in the reaction bed. This coincides with a chlorine feed of approximately 50 gms./min. A previously prepared slag-coke mixture of 70% slag and 30% coke (−30 plus 200 mesh) was then fed to the reactor continuously by a screw feeder, at a net slag rate of approximately 27 gms./min.

In this experiment, a titaniferous slag was used which had the following analysis:

|  | Percent |
|---|---|
| Total Ti as $TiO_2$ | 89.9 |
| FeO | 3.86 |
| MnO | 4.91 |
| MgO | 1.16 |
| CaO | 0.10 |
| $Al_2O_3$ | 1.16 |
| $SiO_2$ | 2.00 |
| $Cb_2O_5$ | 0.50 |
| $P_2O_5$ | 0.07 |

The coke concentration in the solids feed stream constituted an amount approximately 66% in excess of that required for stoichiometric reduction of the slag. The bed temperature was maintained uniformly at 1000° C. throughout the run. The continuous chlorination was allowed to proceed for twenty-two hours. The quality of fluidization remained unimpaired throughout and a 95% recovery of the titaniferous feed as $TiCl_4$ was experienced with a chlorine efficiency of 85%. During the run, solids were continuously removed from the reaction zone through a vertically-disposed overflow tube extending from the top of the bed through the bottom of the reactor. The coke content of the removed solids represented about 12% of the total solids feed. In other words, the solids removed represented the amount of equivalent coke which was in excess of that required for stoichiometric reduction of the slag, in addition to other accumulated residual material. Under the above conditions of operation, an equilibrium bed concentration of by-product molten chlorides (including manganous chloride) of approximately 10.7% was established. Thus, it may be seen that with a slag containing lesser amounts of impurities capable of being converted to molten salts in the reaction bed, correspondingly less severe requirements of reaction bed temperature elevation, excess chlorine and excess coke for liquid adsorption are required.

This is a continuation-in-part of our applications, Serial Nos. 523,086, filed July 19, 1955, and 586,605, filed May 22, 1956, both of which are now abandoned.

We claim:

1. In a process for the production of titanium tetrachloride from a titaniferous material, containing a component forming a liquid metal chloride of low volatility at the hereinafter selected temperature, and wherein said titaniferous material and carbon in finely divided form are added to a hot reaction chamber containing a fluidized bed composed predominantly of carbon, and chlorine is added to said chamber to pass upwardly to provide fluidization of the bed while reacting to form metal chlorides, the improvement comprising removing the low-volatility metal chloride in the volatilized state as formed as part of the exiting gas stream from said chamber by maintaining the reaction zone at a selected temperature of from 800° C. to 1300° C., and by adding an excess of chlorine at a rate sufficient to maintain an amount of unreacted chlorine in said exiting gas stream of at least 15% of the chlorine feed and sufficient to maintain the partial pressure of the low-volatility chloride in said stream such that said chloride is below its dew point at the temperature of said stream, and recovering titanium tetrachloride from the chloride-containing gas removed from the chamber and recovering the unreacted chlorine from said gas.

2. The process of claim 1 wherein titaniferous material and carbon are fed continuously to said bed, said carbon being fed at a rate at least 25% in excess of that required for the reduction of said titaniferous material and wherein said solids are continuously withdrawn from said bed whereby there is maintained in said bed a low volatility chloride content below about 15% by weight.

References Cited in the file of this patent

UNITED STATES PATENTS

| | | |
|---|---|---|
| 2,701,180 | Krchma | Feb. 1, 1955 |
| 2,723,903 | Cyr et al. | Nov. 15, 1955 |
| 2,784,058 | Hair | Mar. 5, 1957 |

OTHER REFERENCES

Chemical Eng. Progress, vol. 50, No. 11, pp. 578, 79 (November 1954).